United States Patent [19]
Hoying et al.

[11] Patent Number: 5,667,286
[45] Date of Patent: Sep. 16, 1997

[54] BRAKE CONTROL SYSTEM

[75] Inventors: John Francis Hoying, Centerville, Ohio; Richard Charles Swortzel, Ann Arbor, Mich.; Deron Craig Littlejohn, Kettering, Ohio; G. Donald Denney, Huber Heights, Ohio; Bryan Peter Riddiford, Spring Valley, Ohio

[73] Assignee: General Motors Corporation, Detroit, Mich.

[21] Appl. No.: 654,982

[22] Filed: May 29, 1996

[51] Int. Cl.$^6$ ........................................ B60T 8/32
[52] U.S. Cl. ............................. 303/140; 303/147
[58] Field of Search .................... 303/146, 147, 303/148, 140, 169, 199, 112; 364/426.01, 426.02, 426.03; 180/197, 233; 188/181 T

[56] References Cited

U.S. PATENT DOCUMENTS

| | | | |
|---|---|---|---|
| 5,172,961 | 12/1992 | Inoue et al. | 303/100 |
| 5,444,621 | 8/1995 | Matsunaga et al. | 364/424.05 |

FOREIGN PATENT DOCUMENTS

| | | | |
|---|---|---|---|
| 0 555 860 A1 | 8/1993 | European Pat. Off. | |
| 41 23 235 C1 | 11/1992 | Germany . | |
| 41 21 954 A1 | 1/1993 | Germany . | |
| 42 00 061 A1 | 7/1993 | Germany . | |
| 42 23 385 A1 | 1/1994 | Germany . | |
| 42 29 504 A1 | 3/1994 | Germany . | |
| 43 11 077 A1 | 10/1994 | Germany . | |
| 43 14 827 A1 | 11/1994 | Germany . | |
| 5262213 | 10/1993 | Japan | 303/146 |
| 624304 | 2/1994 | Japan | 303/146 |
| 687421 | 3/1994 | Japan | 303/146 |
| 6115418 | 4/1994 | Japan | 303/146 |
| 6127354 | 5/1994 | Japan | 303/146 |
| 2 257 551 | 1/1993 | United Kingdom . | |
| 2 263 340 | 7/1993 | United Kingdom . | |
| 2 269 571 | 2/1994 | United Kingdom . | |
| 2 275 312 | 8/1994 | United Kingdom . | |

OTHER PUBLICATIONS

May The Cornering Force Be With You; Popular Mechanics; Dec. 1995 pp. 74–77.
Stable As She Goes; Don Sherman; Automotive Industries; May 1995.
The Spin Doctors; Don Sherman; 12PS95.
Mercedes/Bosch ESP; Automotive Industries; Apr. 1995.
Controlling Vehicle Stability; Christopher A. Sawyer; Automotive Industries; Jan. 1995.
Let Magic Fingers Do The Driving; Wards Auto World; May 1995.
Technoid; Intelligent Brakes Are On The Way; Car and Driver; Aug. 1994.
Toyota Vehicle Stability Control System; Automotive Engineering; Aug. 1995.
Vehicle Dynamics Offers New Level Of Safety;Machine Design; Sep. 1994.
Handling Control Systems For Your Car; Popular Electronics; Feb. 1995.
VDC, The Vehicle Dynamics Control System Of Bosch; A. vanZanten, R. Erhardt & G. Pfaff; Robert Bosch GmbH; #950759; pp. 9–26.
Consideration of Lateral and Longitudinal Vehicle Stability by Function Enhanced Brake and Stability Control System, Heinz Leffler, SAE Technical Paper Series #940832 International Congress & Exposition, Detroit, MI; Feb. 28, 1994–Mar. 3, 1994.

(List continued on next page.)

*Primary Examiner*—Douglas C. Butler
*Attorney, Agent, or Firm*—Anthony Luke Simon

[57] ABSTRACT

In a vehicle with a right front wheel brake, a right rear wheel brake, a left front wheel brake and a left rear wheel brake, a brake control system method for distributing a commanded yaw force to the wheel brakes according to the step of distributing the yaw force to the vehicle wheel brakes according to a priority hierarchy wherein each successive vehicle wheel brake in the priority hierarchy is commanded only if a sum of all previous vehicle wheel brakes in the priority hierarchy have not achieved transfer of the commanded yaw force to the vehicle body.

19 Claims, 8 Drawing Sheets

OTHER PUBLICATIONS

Active Stability Control, Junichi Kubokawa, Aisin Seiki Company, Ltd.; Electroncis and Brake Division; Abstract–ABS/TCS/VDC Toptec; Sep. 22, 1995.

Control of Vehicles Dynamics, Automotive Engineering; pp. 87–93; May 1995.

Spin Control for Cars, Steven Ashley; Mechanical Engineering; pp. 66–68; Jun. 1995.

Improvement of Vehicle Maneuverability by Direct Yaw Moment Conrol; Y. Shibahata, K. Shimada & T. Tomari; Vehicle System Dynamics, 22 (1993) pp. 464–480.

5,667,286

BRAKE CONTROL SYSTEM

This invention relates to a brake control system and method.

BACKGROUND OF THE INVENTION

Automotive vehicles have been produced or demonstrated with brake systems that modulate brake force during stops to provide anti-lock brake control (ABS) and/or that modulate brake force during vehicle acceleration to provide positive acceleration traction control (TCS). Some such brake systems additionally provide braking in a drive by wire mechanization.

SUMMARY OF THE PRESENT INVENTION

It is an object of this invention to provide a brake control system and method according to claim 1.

Advantageously this invention provides a brake control system for actively controlling the brakes of a motor vehicle. Advantageously the brake control system according to this invention allows active control of the wheel brakes at each corner of a vehicle independently.

Advantageously, this invention provides a brake control system for use with controllable hydraulic or electric brakes, or any brake mechanism that can be configured to apply individual wheel brake force independent of the driver input to the brake pedal.

Advantageously, this invention provides a brake control system and method that determines a desired vehicle yaw rate, measures an actual vehicle yaw rate, determines the difference between the desired yaw rate and the actual yaw rate and controls one or more of the vehicle wheel brakes in response to the difference until the difference is below a predetermined threshold.

Advantageously, in one example, this invention provides a brake control system for use in a vehicle with a plurality of wheel brakes including a method for distributing a commanded yaw force to the wheel brakes according to the steps of establishing a priority hierarchy for distribution of the commanded yaw force to the wheel brakes and distributing the commanded yaw force to the vehicle wheel brakes according to the priority hierarchy wherein each successive vehicle wheel brake in the priority hierarchy is commanded only if a sum of all previous vehicle wheel brakes in the priority hierarchy have not achieved transfer of the commanded yaw force to the vehicle body.

Advantageously, in a preferred example, this invention distributes commanded yaw force to the various wheels wherein if the vehicle is turning left or if a measured vehicle yaw rate is less than zero, the priority is successively: the left rear wheel brake, the left front wheel brake and the right front wheel brake, and wherein if the vehicle is turning right or if a measured vehicle yaw rate is not less than zero, the priority is successively: the right rear wheel brake, the right front wheel brake and the left front wheel brake.

Advantageously, in another example, this invention provides a brake control system method for use in a vehicle, comprising the steps of: determining a yaw force command responsive to a plurality of vehicle sensor inputs, wherein the yaw force commands a total yaw force to the vehicle body; applying the yaw force command to (a) only one wheel brake of the vehicle if the one wheel brake can transfer the total yaw force command to the vehicle body, (b) only two wheel brakes of the vehicle if the two wheel brakes can transfer the total yaw force command to the vehicle body and the one wheel brake cannot, and (c) three wheel brakes of the vehicle if the two wheel brakes cannot transfer the total yaw force command to the vehicle body.

Advantageously, according to another example, this invention is used in a vehicle with a controller that determines an operator brake command for each vehicle wheel and an ABS brake command for each vehicle wheel in ABS mode, and comprises a brake control system method according to the steps of: determining a brake adjustment command for at least one wheel responsive to measured vehicle yaw rate; and applying a brake command to the one wheel equal to a minimum of (a) the ABS brake command and (b) a sum of the operator brake command and the brake adjustment command.

Advantageously, according to another example, this invention provides a brake control system method according to the steps of: determining a vehicle yaw rate responsive to a yaw sensor; determining a desired yaw rate responsive to a vehicle speed measurement and a steering wheel angle measurement; determining a yaw rate error equal to a difference between the desired yaw rate and the vehicle yaw rate; operating the brake control in an understeer mode if an absolute value of the vehicle yaw rate is not greater than an absolute value of the desired yaw rate or if an absolute value of the yaw rate error is equal to an absolute value of a difference between the absolute value of the desired yaw rate and the absolute value of the vehicle yaw rate and otherwise operating the brake control in an oversteer mode; and in understeer mode, controlling the brakes to apply a positive yaw force command to the vehicle body, and in oversteer mode, controlling the brakes to apply a negative yaw force command to the vehicle body. Advantageously, vehicle lane change maneuvers are thereby characterized as understeer maneuvers for purposes of yaw control.

In yet another example, this invention provides a brake control system method according to the steps of: determining a yaw rate error between a vehicle yaw rate and a desired yaw rate for the vehicle; determining a yaw force command responsive to the yaw rate error wherein the yaw force command has a proportional term that is linear if the yaw rate error above a predetermined threshold and is nonlinear if the yaw rate error is below the predetermined threshold. In a preferred example, proportional term has a first nonlinear function if the yaw rate error is below the predetermined threshold and the vehicle is in an understeer mode and a second nonlinear function if the yaw rate error is below the predetermined threshold and the vehicle is in an oversteer mode.

BRIEF DESCRIPTION OF THE DRAWINGS

The present invention will now be described by way of example with reference to the following drawings, in which.

DETAILED DESCRIPTION OF THE INVENTION

Figure 1:
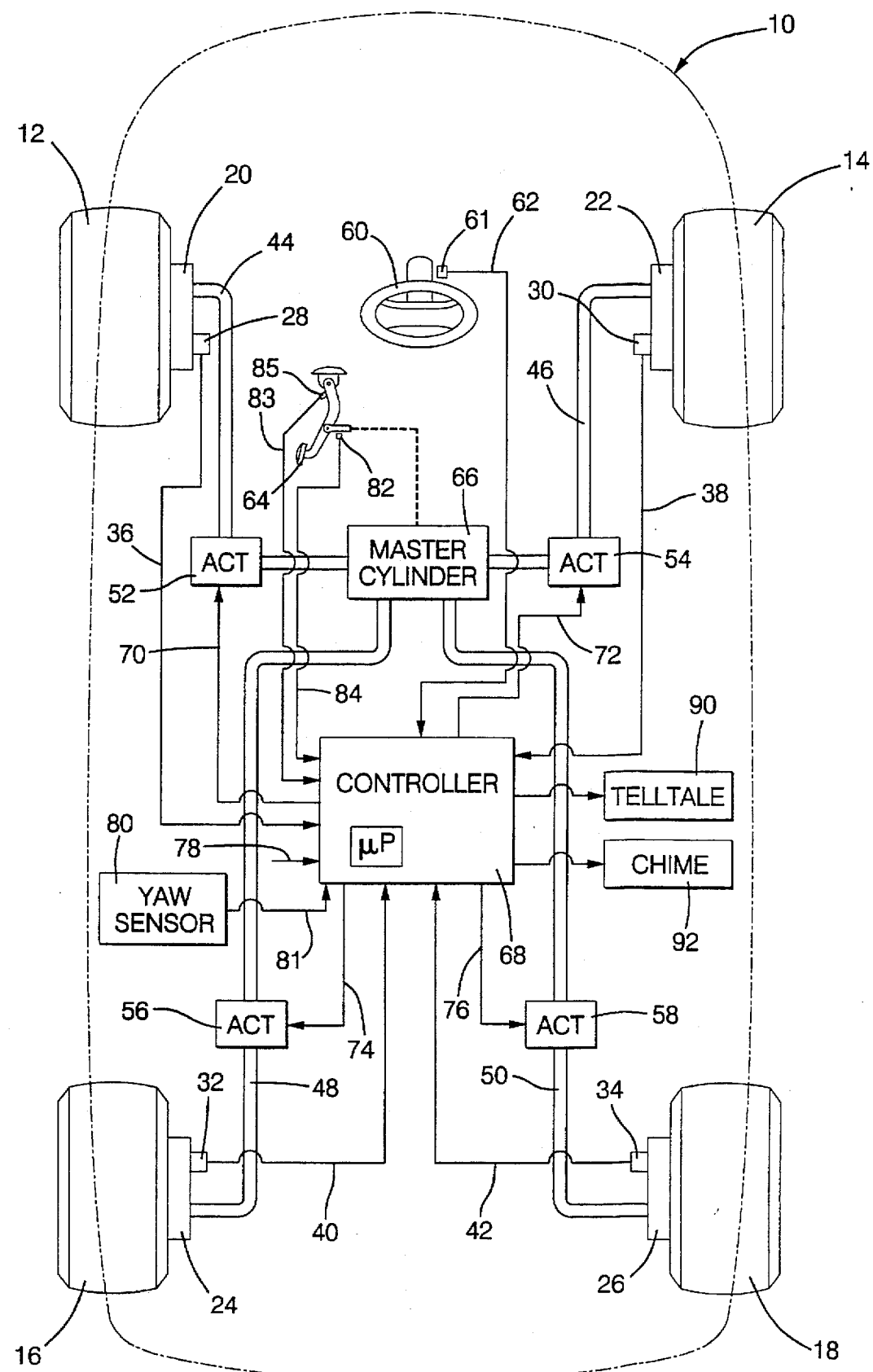
FIG. 1 is an example schematic of a vehicle brake control system according to this invention.

Referring to FIG. 1, the vehicle 10 shown includes a controllable brake system with controller 68 for controlling the brakes 20, 22, 24 and 26 for wheels 12, 14, 16 and 18, respectively. Various inputs to the controller 68 include the wheel speed signals on lines 36, 38, 40 and 42 from wheel speed sensors 28, 30, 32 and 34, the brake pedal switch signal on line 84 from brake pedal switch 82, the brake pedal travel signal on line 83 from pedal travel sensor 85, the steering wheel angle signal on line 62 from sensor 61 indicating the angle of steering wheel 60, the vehicle velocity signal on line 78 and the yaw rate signal on line 81 from yaw rate sensor 80.

Each of the sensors 28, 30, 32, 34, 61, 80, 82 and 85 is implemented in a manner known to those skilled in the art. The brake pedal travel sensor 85 is a rotary resistive sensor mounted at the pivot point of pedal 64 providing a resistive output that changes with the amount of arcuate travel of pedal 64. Alternative sensors for sensor 85 include a pedal travel sensor mounted to the linkage of pedal 64, a pedal force sensor or a master cylinder pressure sensor. In some implementations, combinations of sensors can be used. For example a pedal travel sensor can be used to provide quick response to pedal movement and a master cylinder pressure sensor can be used to detect changes in operator brake pedal force when the pedal is at or near full deflection.

Responsive to the various inputs, the controller controls the braking of each wheel in both base brake and anti-lock braking mode during braking maneuvers and in traction control mode during vehicle acceleration to maintain positive tractive force of the drive wheels on the road surface. The controller also actively controls the wheel brakes 20, 22, 24 and 26 responsive to the sensed vehicle yaw rate as sensed by yaw rate sensor 80 to minimize the difference between the sensed vehicle yaw rate and a desired vehicle yaw rate as computed by controller 68. Because the base braking, antilock braking and traction control functions are known to those skilled in the art, only a general description thereof will be set forth herein.

In base braking mode, the vehicle operator depresses the brake pedal 64 and the amount of depression of the brake pedal 64, as sensed by pedal travel sensor 85, is used in the controller to determine the operator brake command. The controller 68 responsively determines and outputs brake commands for each actuator 52, 54, 56 and 58 to brake the wheels 12, 14, 16 and 18 to achieve the braking response of the vehicle commanded by the vehicle operator. If desired, the brake controller may use other input signals, such as from a master cylinder pressure sensor, to determine the operator brake command.

When the vehicle is in a braking maneuver, as sensed by brake pedal switch 82, the controller monitors the wheel speed signals from sensors 28, 30, 32 and 34 and determines if one or more of the wheels is in or is about to be in an incipient lock-up condition, in which case anti-lock brake control mode for the one or more wheels is activated. In the anti-lock brake control mode, the controller 68 determines and outputs commands to the actuators 52, 54, 56 and 58 corresponding to the wheels in anti-lock brake mode to modulate brake force to the wheels. Through control of the actuators 52, 54, 56 and 58, the controller prevents the wheels from entering a lock-up condition while achieving effective brake control in a manner known to those skilled in the art of anti-lock brake control.

When the vehicle is not in a braking maneuver, but is accelerating due to output motive force from the vehicle prime mover, i.e., the internal combustion engine or electric motor, the controller 68 monitors the wheel speeds sensed by sensors 28, 30, 32 and 34 to determine if the wheels transferring motive force to the road surface are slipping or are about to slip. In such wheel conditions, the controller 68 sends commands to the actuators 52–58 corresponding to the wheels that are slipping or are about to slip to provide brake force to the wheels to reduce the slip. Such control is typically performed in conjunction with a parallel control in the engine or motor controller to temporarily reduce the motive force output until wheel to road traction is reestablished.

In one example, the brake actuators 52–58 are implemented as reciprocating piston actuators of a type known to those skilled in the art. Such actuators typically include a dc motor positionally controlling a reciprocating piston through a rotary to linear motion converter to increase and/or decrease hydraulic pressure in the wheel brakes. In another example, brake actuators 52–58 are implemented as solenoid valves for selectively coupling brakes 20–26 to a source of pressurized hydraulic fluid to increase brake pressure and for selectively coupling brakes 20–26 to a brake fluid reservoir to decrease brake pressure. Implementation of such solenoid valves is known to those skilled in the art. In yet another example, the rear brakes and/or the front brakes may be electric motor-driven brakes, in which case the actuator and brake functions are performed by the same unit. An example of a brake system including front hydraulic brakes and rear electric brakes in which all four brakes are drive by wire is set fort in U.S. Pat. No. 5,366,291, assigned to the assignee of this invention.

Accordingly this invention performs an active brake control of the four wheel brakes 20–26 responsive to the steering wheel angle signal on line 62, the yaw rate signal on line 81 and the vehicle speed signal on line 78. Using these signals, controller 68 determines a desired characteristic vehicle yaw rate and compares that desired yaw rate to the actual yaw rate sensed by sensor 80. If the actual yaw rate of the vehicle differs from the desired yaw rate by more than a predetermined threshold, controller 68 determines and outputs commands to actuators 52, 54, 56 and 58 to control the vehicle wheel brakes 20, 22, 24 and 26 to bring the vehicle yaw rate into conformance with the desired yaw rate.

In carrying out these tasks, controller 68 will typically include a microprocessor, ROM and RAM and appropriate input and output circuits for receiving the various input signals and for outputting the various control commands to the actuators 52, 54, 56 and 58.

Figure 2:
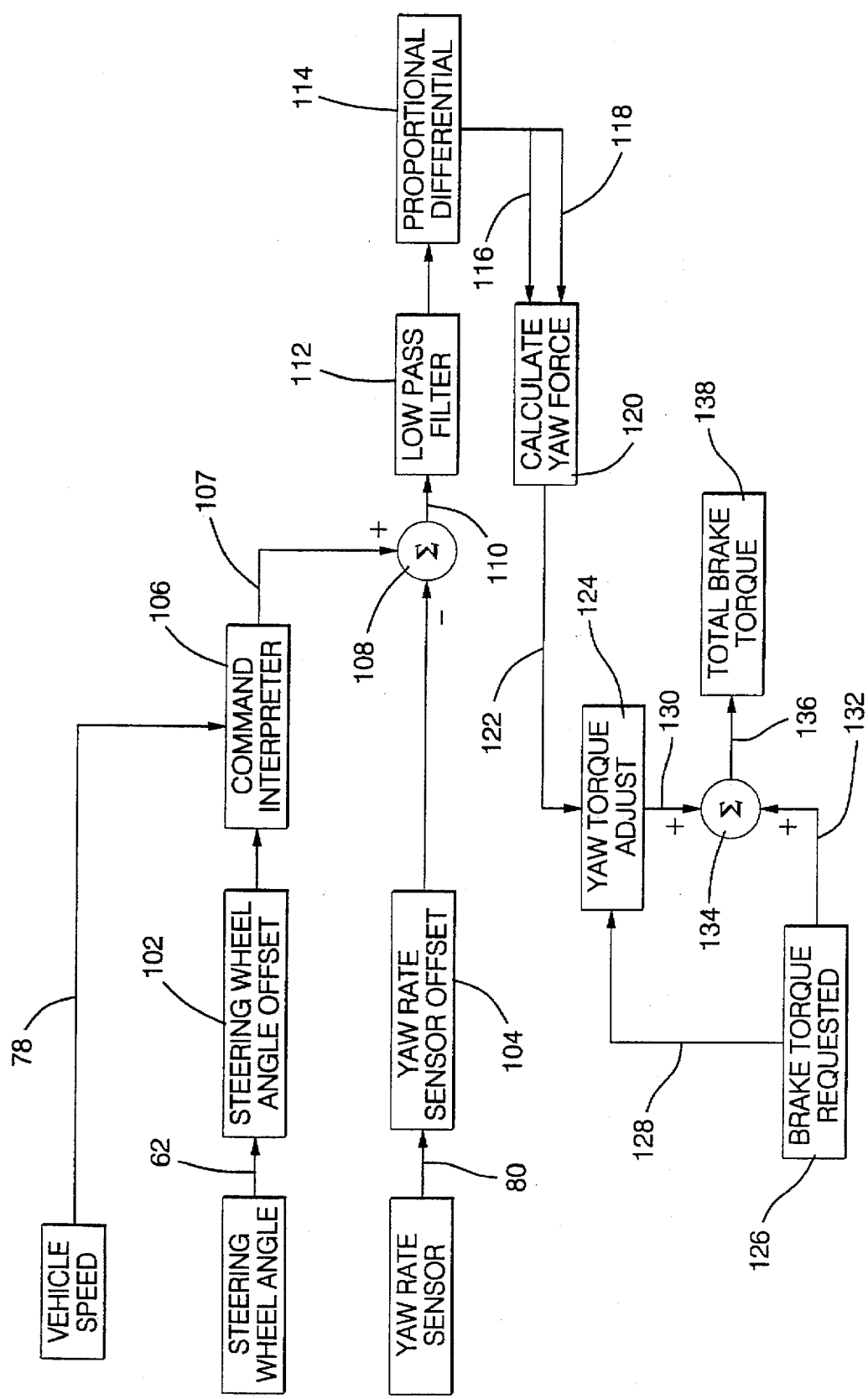
FIG. 2 illustrates an example vehicle yaw rate control according to this invention.

Referring now to FIG. 2, the diagram illustrates the functions performed by controller 68 in controlling the brake system of the vehicle to minimize the difference between actual vehicle yaw rate and a target or desired vehicle yaw rate as computed by the controller 68. Line 62 carries the vehicle steering wheel angle signal from the vehicle steering wheel angle sensor. At block 102, controller 68 adjusts the sensor signal to remove any sensor offset in a manner known to those skilled in the art. The adjusted steering wheel angle signal from block 102 is provided to the command interpreter 106 together with the vehicle speed signal on line 78. Command interpreter 106 comprises a three dimensional look-up table having as its input the adjusted steering wheel angle signal and the vehicle speed signal and providing responsive thereto a target yaw rate signal on line 107. Determining a target yaw rate at block 106 in response to the steering wheel signal and the vehicle speed is a function well known to those skilled in the art and need not be set forth in further detail herein.

According to this invention, the yaw rate sensor signal on line 80 is processed by the controller 68 at block 104 to remove sensor offset and the adjusted yaw rate signal is provided together with the target yaw rate signal to summation block 108. Block 108 subtracts the target yaw rate signal from the actual sensed yaw rate signal to determine a yaw rate error signal on line 110. The yaw rate error signal on line 110 is then low pass filtered at block 112 and provided to a proportional and differential gain block 114 that determines proportion and differential gains used at block 120 to calculate a yaw force command represented by line 122. The proportional and differential gain block 114 is only active if the yaw rate error is over a predetermined threshold. Otherwise, no action is taken.

The proportional and differential control according to this invention uses at block 114 a non-linear look-up table responsive to a determination of whether the vehicle is in understeer or oversteer. Within the proportional and differential controller 114, separate non-linear look-up tables are used to determine proportional gains for occurrences of oversteer and understeer. For large yaw rate error, the proportional gain reverts to a linear fixed gain.

The yaw force command represented by line 122 is determined at block 120 as described in detail further below. The yaw force command on line 122 corresponds to the total yaw torque that must be applied by the wheel brakes to reduce the yaw rate error. The yaw force signal on line 122 is positive if understeer is detected and negative if oversteer is detected.

According to this invention, the YAW force is used at block 124 along with the sign of the steering angle and a braking bit indicating whether or not vehicle commanded braking is occurring to determine a key that commands which order the wheel brakes should receive an adjustment of brake torque to output the commanded yaw force. According to this invention, the wheel brakes are controlled responsive to the key wherein up to three of the vehicle wheel brakes are commanded to add either positive or negative yaw force to the vehicle body. For example, if the yaw force signal on line 122 is positive, the first wheel brake determined by the key is activated to add positive yaw force to the vehicle body. The difference between the yaw force achieved by the first wheel brake and the commanded yaw force is then applied to the second wheel brake determined by the key. The difference between the sum of the yaw forces achieved by the first and second wheel brakes and the commanded yaw force is supplied to the third wheel brake to bring the vehicle actual yaw rate into conformity with the desired yaw rate.

Similarly, if the yaw force on line 122 is negative, then the brake actuator for the first wheel brake determined by the key is commanded to add yaw torque in the negative direction to the vehicle body. The difference between the yaw force on line 122 and that added in the negative direction by the first wheel brake is used to control the brake actuator of the second wheel determined by the key to add in the negative direction additional yaw torque to the vehicle body. The difference between the yaw force on line 122 and that provided by the first and second wheel brakes is used to command the brake for the third wheel determined by the key to add in the negative direction further yaw force to the vehicle body to bring the desired yaw rate and actual yaw rate into conformity with each other.

In the description herein, as a convention, the first, second and third wheel brakes correspond to wheels 1, 2 and 3 that correlate to the inside rear wheel, the inside front wheel and the outside front wheel. As an alternative implementation, when the yaw force on line 122 is negative, wheel 3, the outside front wheel is activated first, receiving a positive brake torque adjustment to add yaw torque in the negative direction to the body. The difference between the yaw force on line 122 and that added in the negative direction by wheel three is then applied to wheel 1, which receives a brake torque adjustment in the negative direction to add yaw torque in the negative direction to the body. Any remainder of the yaw force on line 122 not already applied to the vehicle body is then applied to wheel 2 in a similar manner as it is applied to wheel 1.

In an example, the amount of brake torque that is added in the negative direction to any wheel brake is limited, for example, to a percentage of the driver commanded brake torque to that wheel brake, preventing the active brake control from completely nullifying, for any given wheel, the driver brake command to that wheel. In one example, when the yaw force on line 122 is positive, the brake torque added in the negative direction to wheel 3 is limited to 50% of the driver commanded brake torque to that wheel. In another example, when the yaw force on line 122 is negative, the brake torque added in the negative direction to wheels 1 and 2 is limited to 25% of the driver commanded brake torques to those wheels.

If braking is commanded during the yaw rate control, the operator brake command torque and the commanded yaw rate torque for each wheel are added to provide the total brake torque output for the wheel. According to this invention, anti-lock brake control overrides the active brake control so that brake and/or yaw torque commands tending to bring a wheel into wheel slip trigger ABS mode for the wheel so that the wheel does not lock.

In one example according to this invention, when the yaw force is negative, as in the occurrence of an oversteer condition, the third wheel to be commanded (the outside front wheel) may be commanded with a slip of up to 50% or more. When the yaw force is positive, as in during understeer conditions, the first wheel (the inside rear wheel) may be commanded to run this at a slip level of 50% or more. This advantageous control allows selective slip to provide brake force vectors at the slipping wheel to be used in the active brake control.

According to this invention, when the vehicle speed and/or yaw force or yaw error are below a certain value for a predetermined time period, the active brake control is terminated and the system no longer responds to yaw rate error until the yaw rate error rises above a predetermined threshold.

Block 126 responds to the driver input vis-à-vis the brake pedal and issues a requested brake torque command for each wheel. Those skilled in the art will recognize that there are many known ways to generate the individual wheel brake commands from the brake pedal input, any of which command generation techniques is acceptable for use with this invention. Since such command generation is not central to this invention, it need not be set forth in further detail herein. The requested brake torque command for each wheel is provided both to block 124, the yaw torque adjustment command generator, described in further detail below to implement the control outlined above and to the summation block 132. Block 124 generates the brake torque adjustment command in the manner to be described in further detail below. For each wheel, the brake torque adjustment command on line 130 is summed, at block 134, with the requested brake torque for that wheel on line 132. The result of the summation block 134 is then output on line 136 to block 138, which applies the total brake torque command to the vehicle wheel. Block 138 takes into account other operative functions such as ABS and traction control to control the individual actuators for each wheel.

In general, if a wheel is in ABS, preventing a wheel lock-up condition, the active brake control will not override the ABS and allow lock-up of the wheel. Additionally, if the total brake torque command on line 136 may send a wheel into ABS mode, if the total brake torque command commands more braking for the wheel than is available in conjunction with the given road surface on which the wheel is riding.

Figure 3:
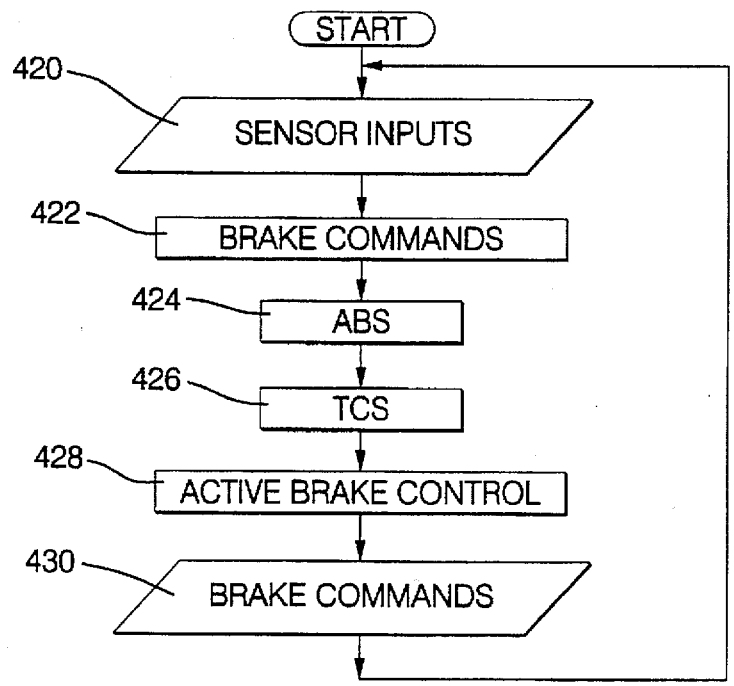
FIGS. 3, 4, 5, 6, 7, 8, 9, 10, 11 and 12 illustrate example flow control routines for implementation of the brake control system according to this invention.

Referring now to FIG. 3, the controller runs a main control routine according to instructions stored in permanent memory to achieve the brake control functions described herein. In general the controller performs typical startup and initialization functions and then moves to block 420 where it receives an input of the vehicle speed signal and receives the sensor input signals from the various sensors, including the wheel speed sensors, the steering wheel angle sensor, the yaw rate sensor, the brake pedal switch, a brake pedal travel or pressure sensor, etc. At block 422, the routine determines brake commands in a known manner responsive to the operator brake pedal position or pressure commands. At block 424, the routine determines if any of the vehicle wheels are in antilock brake mode and, if so, determines antilock brake commands for those wheels in a manner known to those skilled in the art. At block, 426, the routine determines if any of the vehicle drive wheels are slipping during acceleration of the vehicle, in which case the vehicle controller determines traction control brake commands in a manner known to those skilled in the art.

At block 428 the routine performs the active brake control according to this invention as described below and determines brake command adjustments for individual wheel brakes as described herein. At block 430, the main control routine outputs the brake commands to the brake actuators in a manner known to those skilled in the art to effect the commanded control of the actuators and wheel brakes.

Example implementations of blocks 420, 422, 424, 426 and 430 are known to those skilled in the art and need not be set forth herein in further detail. The function of block 428, the active brake control according to this invention, will now be described in detail with reference to FIGS. 4–14.

Figure 4:
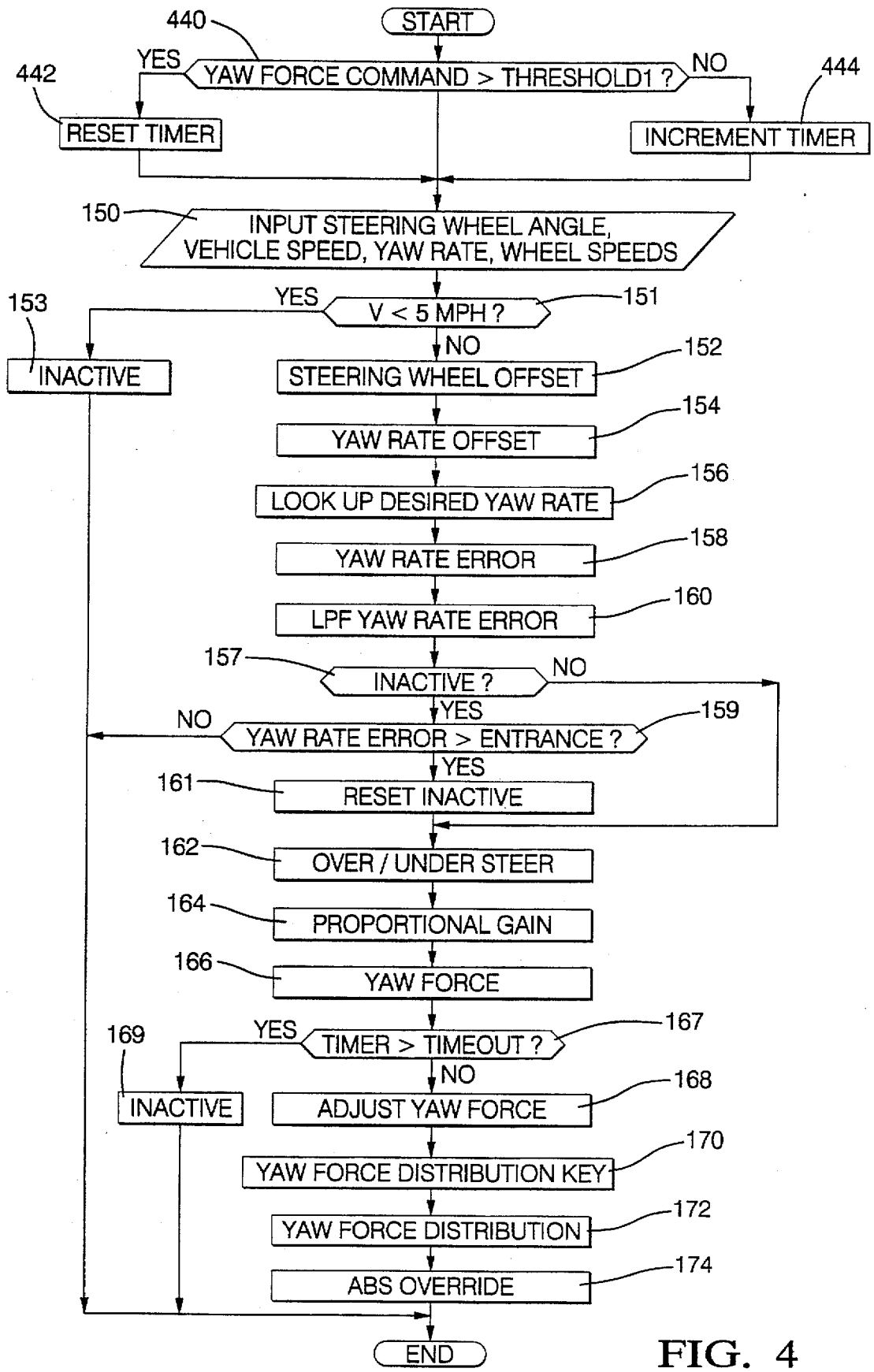

Referring to FIG. 4, the active brake control first determines at block 440 whether the YAW FORCE command, determined as described below, is greater than a predetermined value THRESHOLD1. If the YAW FORCE command is greater than THRESHOLD1, block 442 resets the value TIMER to zero, otherwise block 444 increments the value TIMER. The value TIMER is used to determine whether or not the active brake control according to this invention is enabled. According to this invention, if the YAW FORCE command is less than the value THRESHOLD1 for a predetermined time period, then the active brake control is disabled until the vehicle steering has been centered, the vehicle speed is greater than 6 MPH, and the YAW RATE ERROR command (described below) rises above an entrance criteria threshold, ENTRANCE.

The routine, at block 150, receives input signals of steering wheel angle, vehicle speed, measured yaw rate and wheel rotational velocities and any other signals desired for use by the controller 68 in performing other chassis or brake control functions. Block 151 compares the vehicle speed signal to a threshold value, for example, 5 MPH, and if the vehicle speed is below the threshold value, the routine moves to block 153 where it sets the INACTIVE flag and then exits the program. If at block 151 the vehicle speed is not below the threshold value, the routine continues to block 152. Blocks 152 and 154 perform offset processing of the steering wheel angle and measured yaw rate signals to remove, in a manner known to those skilled in the art, any sensor offset bias and the potential for error resulting therefrom.

At block 156 the controller uses a look-up table to determine the DESIRED YAW RATE of the vehicle, preferably from a three dimensional look-up table responsive to the steering wheel and vehicle speed signals in a manner known to those skilled in the art, with standard linear interpolation between table values. Alternatively, a known equation for commanded yaw based on vehicle speed and steering wheel angle may be used to determine the DESIRED YAW RATE. Either example is easily obtained by one skilled in the art and need not be set forth in detail herein. The DESIRED YAW RATE is then used at block 158 to determine YAW RATE ERROR by subtracting the DESIRED YAW RATE from the measured vehicle yaw rate as sensed by the yaw rate sensor. Block 160 low pass filters the YAW RATE ERROR using a conventional one pole low pass filter digitally implemented in the controller 68 in a manner known to those skilled in the art. Unless otherwise indicated, the YAW RATE ERROR referred to below in describing the remainder of the control routine is the low pass filtered YAW RATE ERROR determined at block 160.

At block 157 the routine checks the INACTIVE flag. If the INACTIVE flag is set at block 157, the routine moves to block 159 where it compares the filtered YAW RATE ERROR to a threshold value ENTRANCE. If the YAW RATE ERROR is not greater than the threshold value ENTRANCE, then the routine exits. If the YAW RATE ERROR is greater than ENTRANCE or if at block 157 the INACTIVE flag is not set, the routine continues to block 162. Additionally, if desired, the difference between the present YAW RATE ERROR and a previous YAW RATE ERROR may be added to the present YAW RATE ERROR and compared to a threshold and if greater than the threshold, the INACTIVE flag is reset at block 161. This provides entrance criteria into the brake control based on magnitude of YAW RATE ERROR and rate of change of YAW RATE ERROR.

At block 162, a subroutine is performed by the microprocessor to determine whether or not the vehicle is in understeer or oversteer. The subroutine performed at block 162 is shown in FIG. 5.

Figure 5:
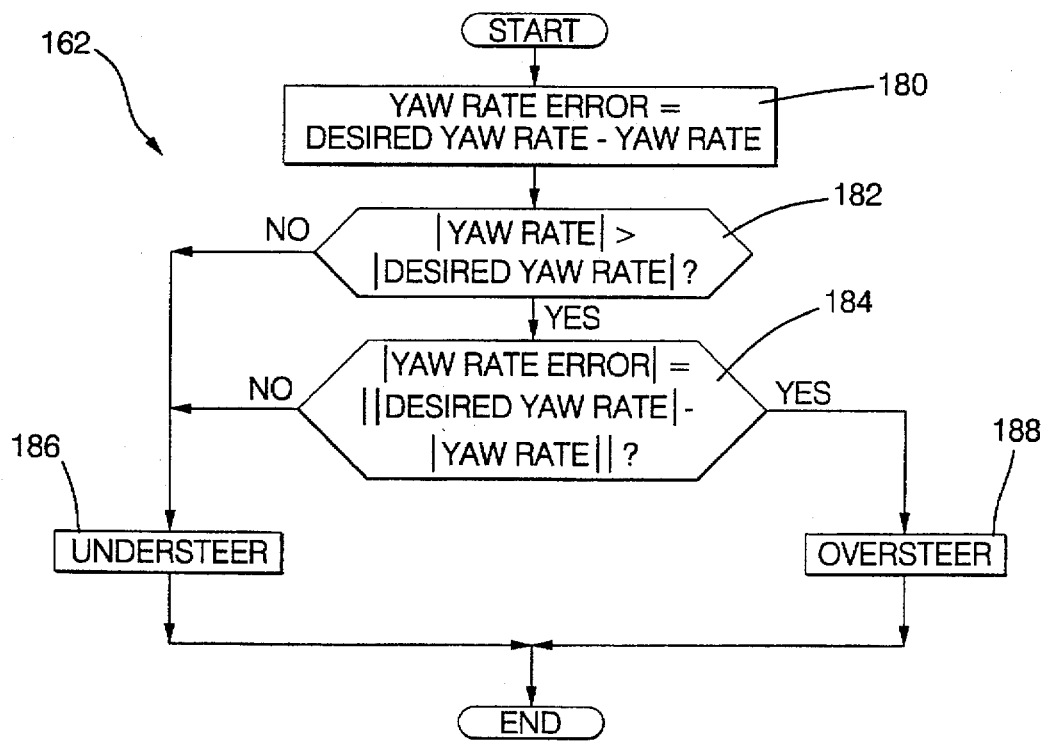

Referring now to FIG. 5, block 180 retrieves the YAW RATE ERROR determined at block 158 and filtered at block 160 and then moves to block 182 where the measured yaw rate, YAW RATE, is compared to the DESIRED YAW RATE. If the measured YAW RATE is greater than the DESIRED YAW RATE, the routine moves to block 184. At block 184, the absolute value of the YAW RATE ERROR is compared to the absolute value of the difference between the absolute value of the DESIRED YAW RATE minus the absolute value of the YAW RATE. If the absolute value of the YAW RATE ERROR is equal to the absolute value of the DESIRED YAW RATE minus the absolute value of the YAW RATE, then the routine moves to block 188 where the OVERSTEER flag is set. However, if either of the tests at blocks 182 or 194 fail, then it is determined that the vehicle is experiencing understeer and the routine moves to block 186 where the UNDERSTEER flag is set. The over/understeer sub routine 162 is then exited.

Referring again to FIG. 4, after the over/understeer subroutine is ended, the routine moves to block 164 where the routine determines the proportional gain for the proportional and derivative controller. The subroutine for determining the proportional gain at block 164 is shown in FIG. 6.

Figure 6:
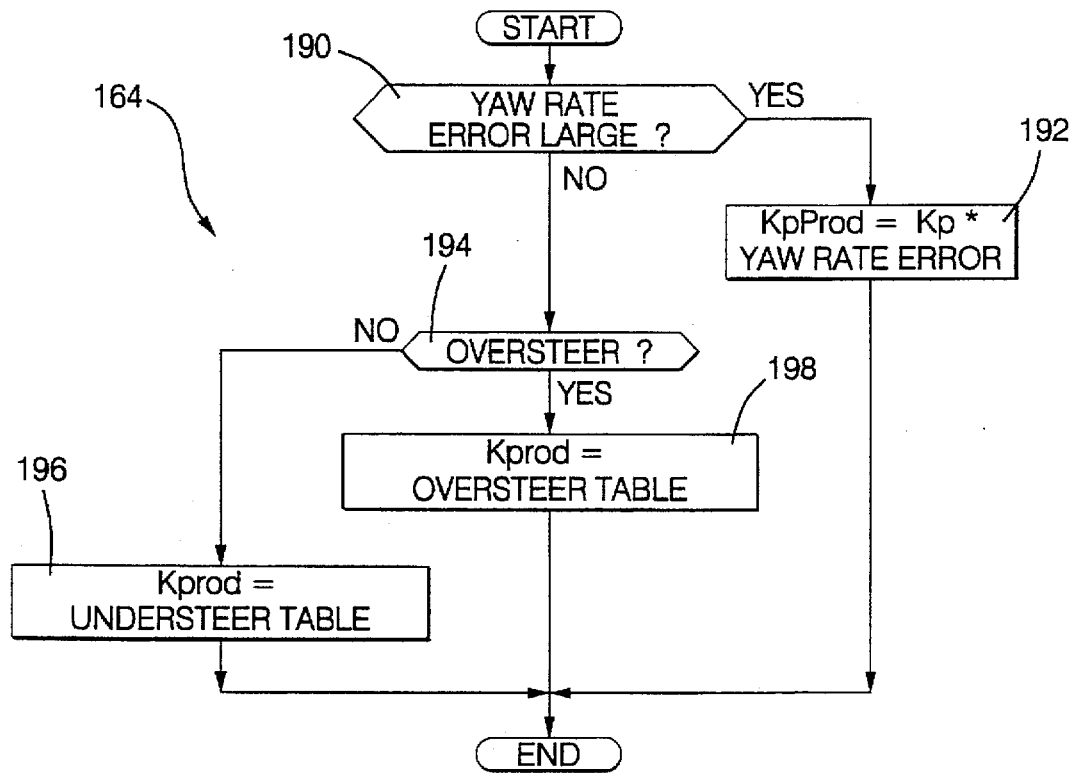

Referring now to FIG. 6, block 190 determines if the YAW RATE ERROR (filtered) is greater than a predetermined threshold. If the YAW RATE ERROR is greater than the predetermined threshold, block 192 sets the proportional gain product of the YAW FORCE command equal to a proportional constant $K_p$ times the YAW RATE ERROR and the routine then exits.

If at block 190 the YAW RATE ERROR is not greater than the predetermined threshold, the routine moves to block 194 where it checks the OVERSTEER flag. If the OVERSTEER flag is not set, the routine moves to block 196 where the proportional term of the YAW FORCE command is determined from a look-up table, including the non-linear function represented by trace 204 in FIG. 7. The look-up table uses the YAW RATE ERROR as the input and provides the proportional term as the output. If at block 194 the OVERSTEER flag is set, then the routine moves to block 198 where it uses a look-up table to determine the proportional product term of the YAW FORCE command according to the non-linear function shown by reference 202 in FIG. 7, again using the YAW RATE ERROR as the input. The proportional term of the YAW FORCE command routine for block 164 is then exited.

Figure 7:
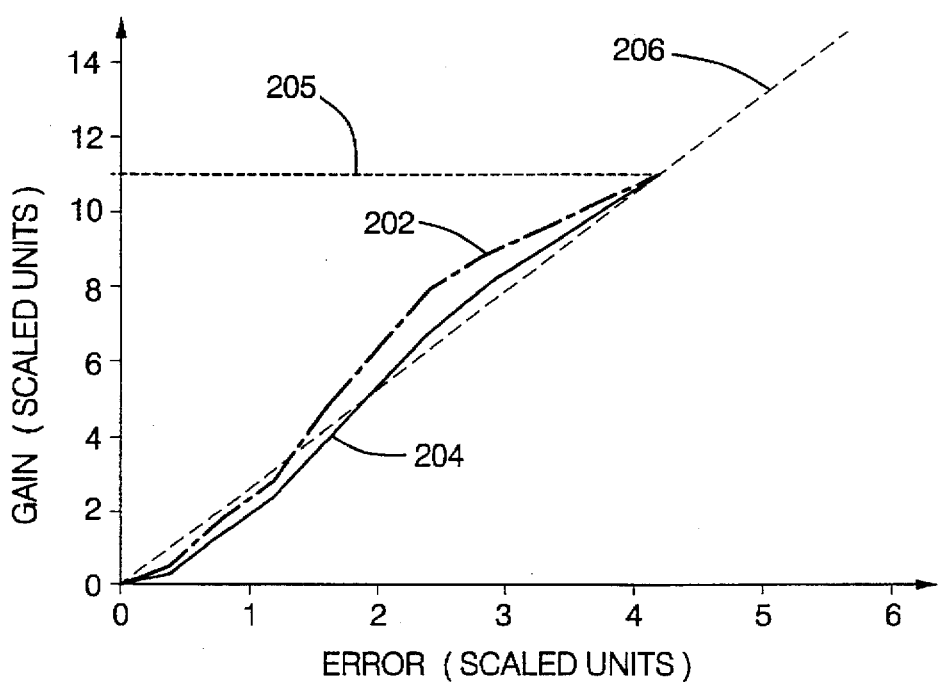

In FIG. 7, the straight line 206 represents the linear proportional term function performed at block 192 for large YAW RATE ERROR's above the threshold 205 on the vertical axis of the graph.

Referring again to FIG. 4, after the subroutine at block 164 is performed, the routine moves to block 166 where it determines the YAW FORCE command represented by line 122 in FIG. 2. The YAW force command at block 166 is determined in the manner shown in FIG. 8.

Figure 8:
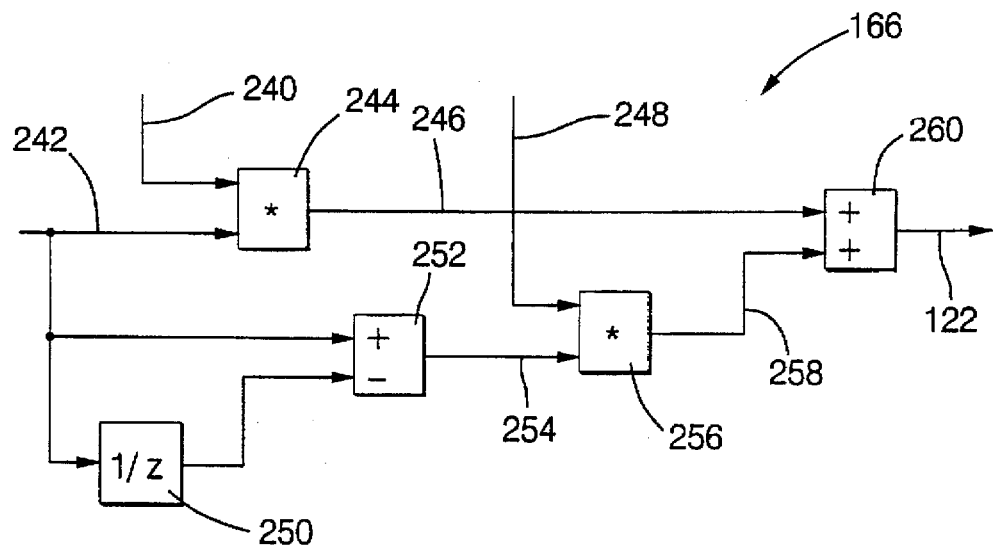

Referring to FIG. 8, the proportional product on line 246, resulting from the YAW RATE ERROR on line 242, the proportional gain on line 240 and multiplication block 244, is the proportional term determined at block 164 as described above. The proportional gain on line 240 is determined as described above with reference to FIG. 7. The derivative term on line 258 is determined responsive to the YAW RATE ERROR on line 242 and the derivative gain 248, which is a predetermined constant stored in computer memory. The YAW RATE ERROR on line 242 is passed through a phase delay filter, block 250. At block 252, the phase delayed YAW RATE ERROR is subtracted from the YAW RATE ERROR on line 242 to determine the derivative signal on line 254. At block 256, the derivative signal is then multiplied by the derivative gain on line 248 to determine the derivative term of the YAW FORCE command on line 258. The proportional and derivative terms of the YAW FORCE command on lines 246 and 258 are then summed at block 260 to determine the YAW FORCE command on line 122.

After the YAW FORCE is determined at block 166, the routine moves to block 167 (FIG. 4) where it compares the value TIMER to its time-out value TIMEOUT. If TIMER is greater than TIMEOUT, then the active brake control according to this invention is disabled at block 169 by setting the INACTIVE flag and the routine is exited. Otherwise, the routine continues to block 168 where it performs a subroutine for adjusting the YAW FORCE command responsive to whether the vehicle is in UNDERSTEER or OVERSTEER mode.

Figure 9:
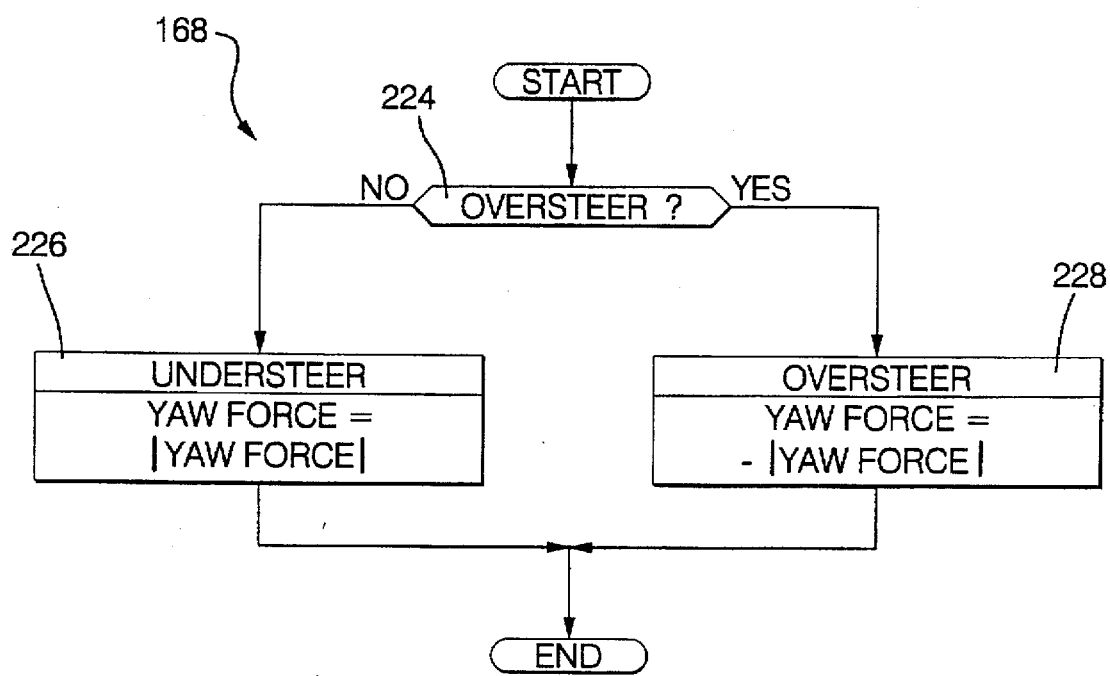

Referring to FIG. 9, the subroutine for adjusting the YAW FORCE command starts at block 224, where it checks the OVERSTEER flag. If the OVERSTEER flag is set, the routine moves to block 228 where the YAW FORCE command is set equal to the negative of the absolute value of the YAW FORCE command and then exits. If at block 224 the OVERSTEER flag is not set, the routine moves to block 226 where the YAW FORCE command is set equal to the absolute value of the YAW FORCE command and then exits.

Referring again to FIG. 4, after YAW FORCE adjustment subroutine at block 168 is performed, the routine moves to block 170 where it performs a subroutine for determining the yaw force distribution variable, KEY.

In general, the yaw force distribution variable KEY is determined responsive to the sign of the adjusted YAW FORCE, the sign of the steering angle and whether or not there is a braking request. The three inputs are provided to a series of logic operations that determine the variable KEY as set forth in FIG. 10.

Figure 10:
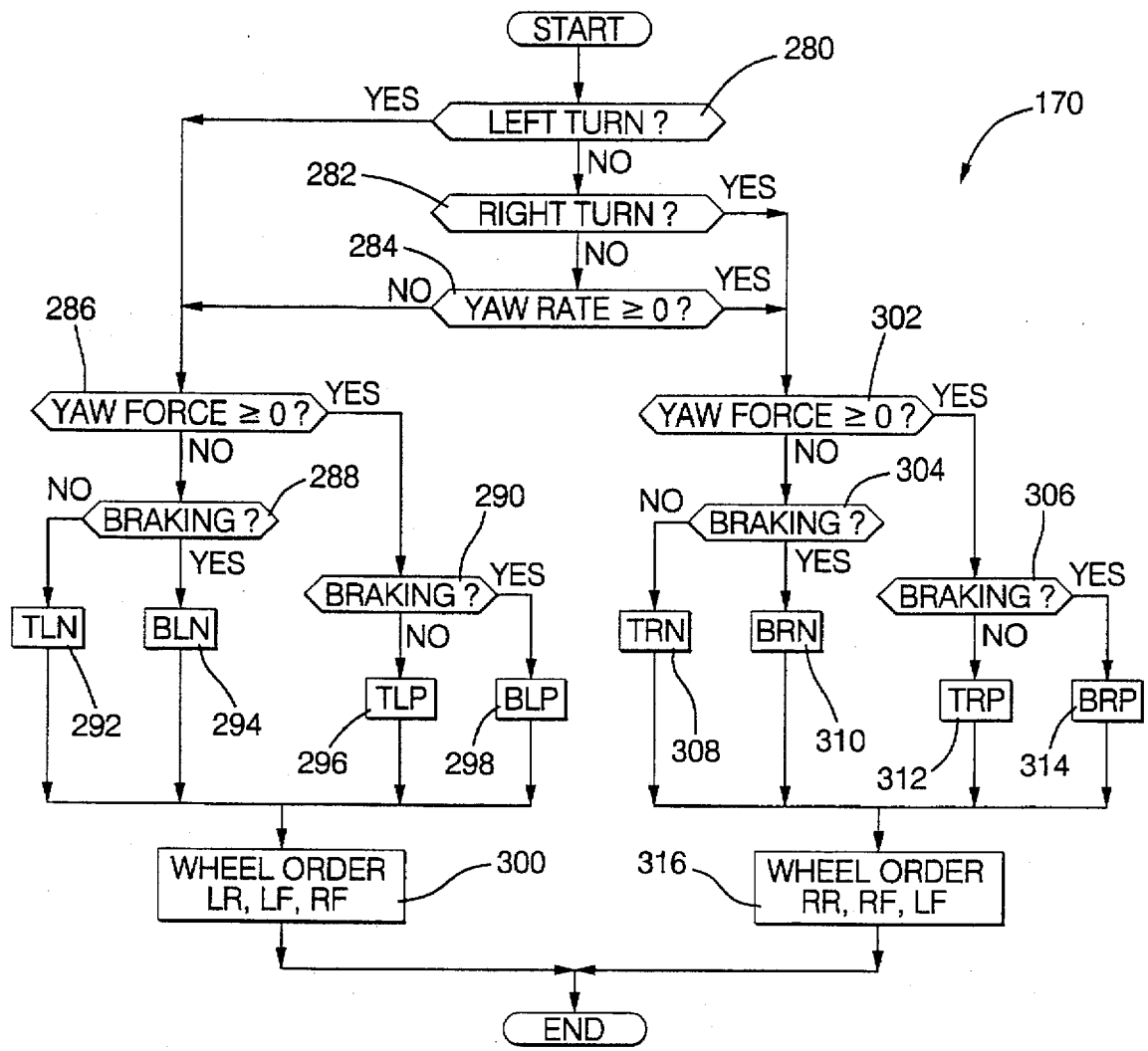

Referring now to FIG. 10, the subroutine starts at block 280 where it determines, responsive to the steering wheel angle signal, whether or not the vehicle is making a left turn. If not, the routine moves to block 282 where it determines, responsive to the steering wheel angle signal, whether or not the vehicle is making a right turn. If so, the routine moves to block 302. If not, then the steering wheel input indicates that the vehicle driver is not steering a turn and the routine moves to block 284 where it compares the measured YAW RATE to zero. If the YAW RATE is greater than or equal to zero, the routine moves to block 302. Otherwise, the routine moves to block 286 where the routine also moves if block 280 determines that the vehicle is making a left turn.

At block 286, the YAW FORCE is compared to zero. If YAW FORCE is greater than or equal to zero, the routine moves to block 290 where it determines whether or not the vehicle operator is commanding vehicle braking. If not, the routine moves to block 296 where it sets the variable KEY to TLP. If at block 290 there is commanded braking, the routine moves to block 298 where it sets the variable KEY to BLP.

At block 286, if the commanded YAW FORCE is not greater than or equal to zero the routine moves to block 288 where it determines whether or not there is operator commanded braking. If there is operator commanded braking, the routine moves to block 294 where it sets the variable KEY equal to BLN and otherwise moves to block 292 where it sets the variable KEY to TLN.

Similarly, block 302 compares the command YAW FORCE to zero. If YAW FORCE is greater than or equal to zero, the routine moves to block 306 where it determines if there is operator commanded braking. If there is operator commanded braking at block 306, the routine moves to block 314 where it sets the variable KEY equal to BRP. If there is no operator commanded braking at block 306, the routine moves to block 312 where it sets the variable KEY equal to TRP. If, at block 302, the YAW FORCE is not greater than or equal to zero, the routine moves to block 304 where it determines whether or not there is operator commanded braking. If there is operator commanded braking, the routine moves to block 310 where it sets the variable KEY equal to BRN and otherwise moves to block 308 where it sets the variable KEY equal to TRN.

Thus, through the logic operation of the subroutine, the variable KEY is set denoting various modes of vehicle operation as follows: BRP represents that the vehicle is braking, in a right turn and the YAW FORCE command is positive; BRN represents that the vehicle is braking, in a right turn and the YAW FORCE command is negative; BLP represents that the vehicle is braking, in a left turn and the YAW FORCE command is positive; BLN represents that the vehicle is braking, in a left turn, and the YAW FORCE command is negative; TRP represents that the vehicle is not braking, in right turn and the YAW FORCE command is positive; TRN represents that the vehicle is not braking, in a right turn and the YAW FORCE command is negative; TLP represents that the vehicle is not braking, in a left turn, and the YAW FORCE command is positive; and TLN represents that the vehicle is not braking, in a left turn and the YAW FORCE command is negative.

From blocks 292, 294, 296 and 298 the routine moves to block 300 where it sets the wheel order flag to designate the left rear, left front and right front wheels as the first, second and third wheels, respectively, in the hierarchy to receive YAW FORCE commands. From blocks 308, 310, 312 and 314 the routine moves to block 316 where it sets the wheel order flag to designate the right rear, right front and left front wheels as the first, second and third wheels, respectively, in the hierarchy to receive YAW FORCE commands. The subroutine is then exited.

Referring again to FIG. 4, once the subroutine at block 170 is performed, the routine moves to block 172 where it determines the amount of YAW FORCE to be distributed to each of the wheels. In general, the YAW FORCE distribution subroutine 172 uses the variable KEY, a set of maximum brake force constants, the YAW FORCE command and the requested brake torque for each wheel, BRAKE1, BRAKE2 and BRAKE3 to determine brake torque adjustments to control the wheel brakes to transfer the YAW FORCE command to the vehicle body. The routine determines the torque adjustments and tries to apply all of the YAW FORCE command to the first wheel determined by the wheel order flag. If any YAW FORCE command is left over, as much as possible is applied to the second wheel and the rest to the third wheel.

The routine achieves this by first setting the torque adjust commands, ADJUST1, ADJUST2 and ADJUST3 to zero and determining which wheels correspond to ADJUST1, ADJUST2 and ADJUST3 based on the wheel order flag. ADJUST1 corresponds to either the left rear wheel or right rear wheel, ADJUST2 corresponds to either the left front wheel or the right front wheel and ADJUST3 corresponds to either the right front or the left front, as determined by the wheel order flag.

If the input YAW FORCE is positive, the routine determines the torque adjustment available for the first wheel. This is accomplished by subtracting the requested brake torque (the brake torque from the brake pedal as distributed to each wheel brake) from the maximum brake torque for the first wheel. The difference is then stored in the memory location called AVAIL. If AVAIL is greater than or equal to the total YAW FORCE, the first corner receives all of the torque adjustment and the adjustment is made equal to the YAW FORCE command. This step represents an example of when only one wheel is used to control yaw. If AVAIL is less than the YAW FORCE, the first wheel receives a positive brake torque adjustment command equal to the value AVAIL. In the preferred implementation, to assist ABS operation of the first wheel, the positive brake torque adjustment command is set equal to YAW FORCE. The controller then checks to see if any YAW FORCE not applied to the first wheel brake exists by subtracting AVAIL from the total YAW FORCE and storing the result in the memory location REST.

AVAIL is updated for the second wheel by subtracting the requested brake torque from the maximum brake torque for the second wheel. If the brake torque available on the second wheel is greater than the left over REST, the second wheel receives a brake command equal to the requested brake torque summed with the value REST and no adjustment is made to the third wheel. Otherwise, the second wheel receives the brake adjustment command AVAIL (in the preferred implementation, to assist performance of ABS of the second wheel, the value brake adjustment command is in this instance set equal to the value REST) and the value REST is updated to equal the difference between AVAIL and REST.

For the third torque adjustment to the third wheel, the brake control algorithm reduces braking on a third wheel, if necessary, to assign any left over YAW FORCE equal to the value REST. However, if no braking is commanded, there can be no torque adjust to the third wheel.

If the input YAW force is negative, the brake control routine distributes YAW force in a similar manner, except the torque adjustments are negative for wheels 1 and 2, subtracting brake torque from the wheels, and positive for wheel 3, adding brake torque to the wheel.

As an alternative, wheel 3, the outside front wheel, receives positive brake torque adjustment using the YAW FORCE command. A value REST is determined as described above and applied to wheel 1, the inside rear wheel to affect negative torque adjustment to wheel 1. Any remainder of REST not applied to wheel 1 is then applied to wheel 2, the inside front wheel to affect negative torque adjustment to wheel 2.

For each wheel, the total brake torque is the sum of the brake torque distributed to that wheel by the brake pedal command and the brake torque adjustment for that wheel.

Figure 11:
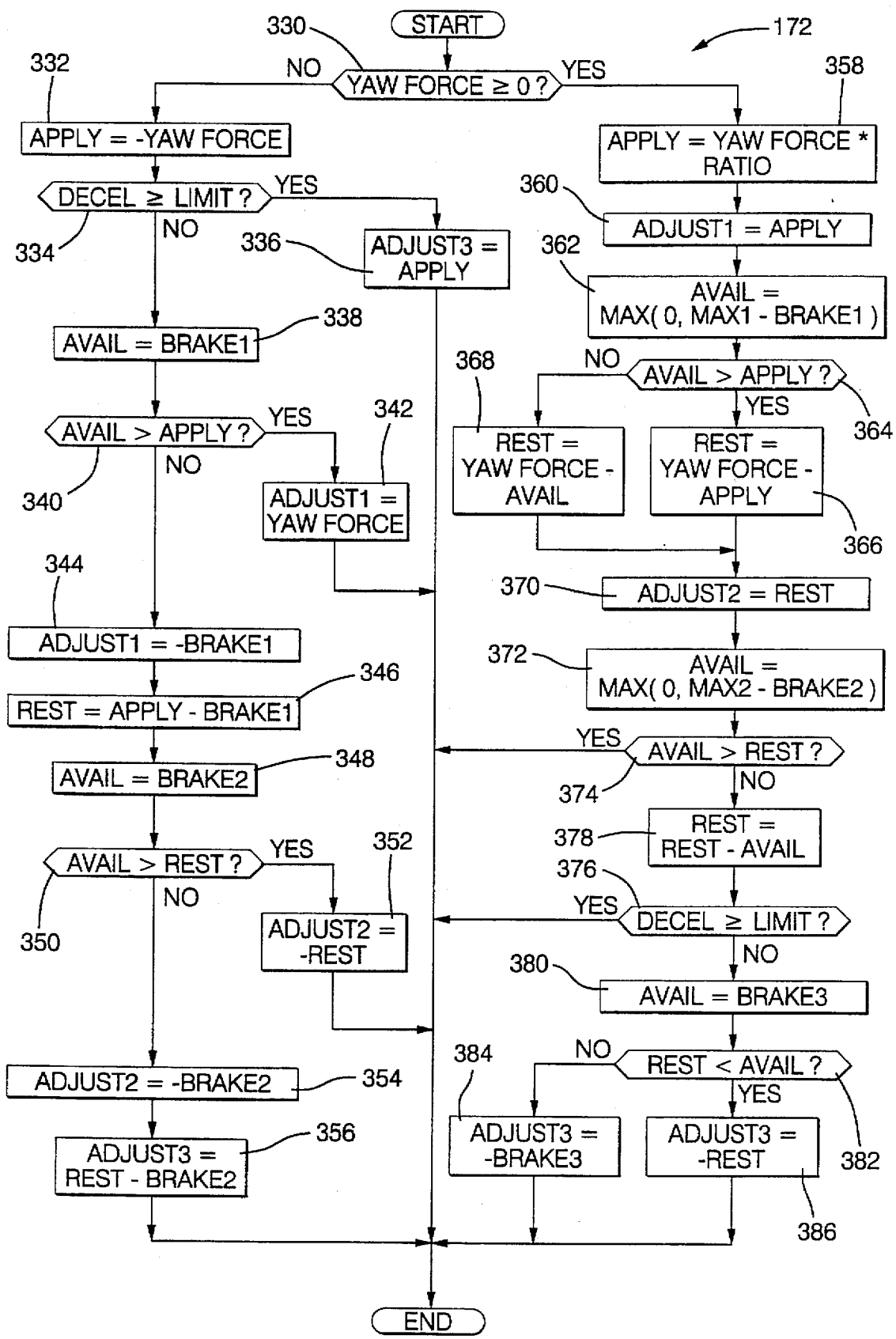

Referring now to FIG. 11, an example yaw force distribution subroutine is shown that is an alternative to the above described control. In general, when a positive yaw force is commanded, it is initially distributed so that only a percentage of the yaw force command is applied to wheel 1, for example 50%. The remainder of the yaw force command, i.e., the other 50%, is then applied to wheel 2, with the portion of the first 50% applied to wheel 1 that wheel 1 was not able to achieve. The remainder of the yaw force commanded to wheel 2 is then applied to wheel 3.

More particularly, the routine starts at block 330 where it determines whether or not YAW FORCE is positive. If YAW FORCE is positive, the routine moves to block 358 where it determines the command APPLY equal to YAW FORCE multiplied by a constant RATIO, representing a desired front to rear brake force distribution. At block 360, the variable ADJUST1 corresponding to the torque adjustment for the first wheel brake determined by the wheel order flag is set equal to the value APPLY. At block 362, the variable AVAIL is then set equal to the maximum of zero and MAX1 subtracted by the operator command BRAKE1, the commanded brake torque for the first wheel. MAX1 represents the maximum brake torque output of the first wheel brake and is a constant unless the wheel is in ABS mode, in which case MAX1 is reduced to reflect the maximum brake torque achieved during the ABS cycle. Known ABS brake control routines track the maximum brake pressure or commanded torque in a brake apply cycle, which is used (with proper scaling) as MAX1.

Block 364 compares AVAIL to APPLY and if the value AVAIL is greater than the value APPLY, the routine moves to block 366 where the variable REST is set equal to YAW FORCE minus APPLY. If at block 364 the value AVAIL is not greater than the value APPLY, the routine moves to block 368 where the variable REST is set equal to YAW FORCE minus AVAIL. At block 370 the routine sets the command ADJUST2, the torque adjust command for the second wheel, equal to the value REST. Then at block 372 the command AVAIL is updated equal to the maximum of zero or MAX2 (i.e., similar to MAX1 above, but for wheel 2) subtracted by the command BRAKE2, the operator commanded brake torque for the second wheel.

Block 374 compares the value AVAIL to the value REST. If AVAIL is greater than REST, the subroutine ends. Otherwise, the routine moves to block 378 where the variable REST is updated to equal REST minus AVAIL. The routine then moves to block 376 where it compares the variable DECEL representing the operator commanded vehicle deceleration to the variable LIMIT, representing a threshold value. The operator commanded deceleration is determined response to the amount of brake pedal force as measured by either a brake pedal travel sensor, a master cylinder pressure sensor or a brake force sensor. The comparison to the threshold LIMIT is used to prevent the brake control from releasing brake pressure if the operator commanded deceleration is above LIMIT, relying instead on only addition of brake torque to control yaw. If the variable DECEL is greater than or equal to the variable LIMIT, the routine ends. Otherwise, the subroutine moves to block 380 where the variable AVAIL is reset equal to BRAKE3, which is the operator brake command to the third wheel.

The routine then moves to block 382 where the variable REST is compared to the variable AVAIL. If REST is less than AVAIL, the routine moves to block 386 where it sets the command ADJUST3, the torque adjustment for the third wheel brake, equal to the negative of REST. If at block 382 REST is not less than AVAIL, the routine moves to block 384 where it sets the command ADJUST3 equal to negative BRAKE3, after which the subroutine ends.

Referring again to block 330, if the YAW FORCE command is not greater than or equal to zero, the routine moves to block 332 where it sets the variable APPLY equal to the negative of the YAW FORCE command. Then, at block 334, the routine compares the variables DECEL and LIMIT and if DECEL is greater than or equal to LIMIT, the routine moves to block 336 where the command ADJUST3 is set equal to the command APPLY and the subroutine ends. If at block 334 DECEL is less than LIMIT, the routine moves to block 338 where the variable AVAIL is set equal to BEAKE1.

At block 340, the variable AVAIL is compared to the variable APPLY. If at block 340 the variable AVAIL is greater than the variable APPLY, the routine moves to block 342 where the command ADJUST1 is set equal to the YAW FORCE and then the subroutine ends. If at block 340 the variable AVAIL is not greater than the variable APPLY, the routine moves to block 344 where the command ADJUST1 is set equal to the negative of BRAKE1.

Then at block 346, the variable REST is set equal to APPLY minus BRAKE1 and at block 348 the variable AVAIL is reset equal to BRAKE2. At block 350, the variable AVAIL is compared to the variable REST. If the variable AVAIL is greater than the variable REST, the routine moves to block 352 where the command ADJUST2 is set equal to negative REST and then the subroutine ends. If at block 350 the variable AVAIL is not greater than the variable REST then the routine moves to block 354 where the command ADJUST2 is set equal to negative BRAKE2. Block 356 then sets the command ADJUST3 equal to REST minus BRAKE2 and then ends.

Referring again to FIG. 4, after the subroutine represented by block 172 determines ADJUST1, ADJUST2 and ADJUST3, the routine moves to block 174 where it determines for each wheel whether or not there is an ABS override of the yaw control. The flow of the ABS override function of block 174 is shown in FIG. 12.

Figure 12:
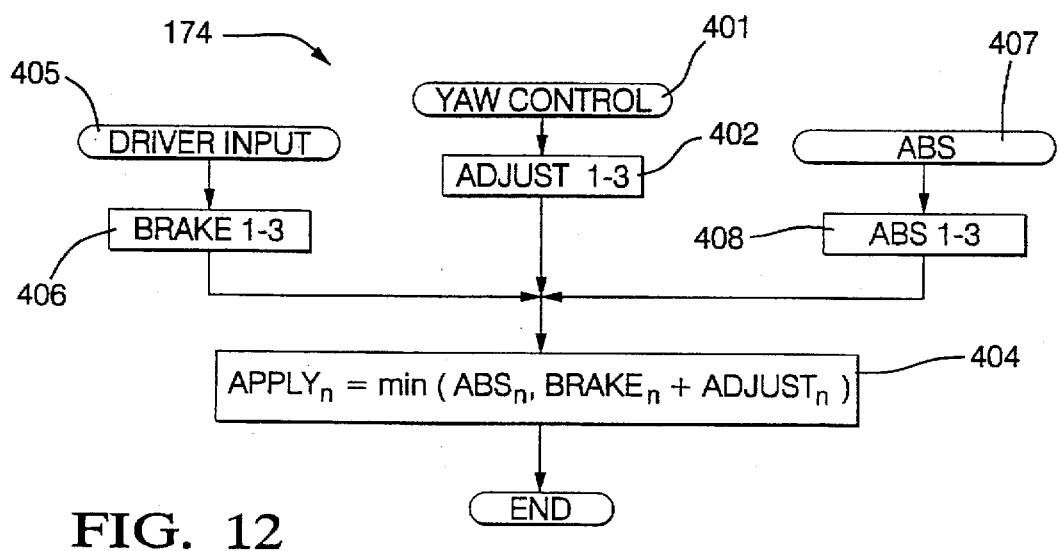

Referring now to FIG. 12, blocks 401, 405 and 407 represent that the three inputs to the ABS override logic are the yaw control commands, ADJUST1, ADJUST2 and ADJUST3 (block 402), the operator brake commands BRAKE1, BRAKE2 and BRAKE3 (block 406) and the ABS control logic that determines which, if any, of the wheels are in ABS mode and, if so, determines ABS brake commands for those wheels, ABS1, ABS2 and ABS3 (block 408).

Block 404 sets, for each wheel, the brake command APPLYn (n=1, 2, 3) equal to the minimum of the ABS command ABSn (n=1, 2, 3) and the sum of the operator brake command BRAKEn (n=1, 2, 3) and the yaw torque adjustment ADJUSTn (n=1, 2, 3).

Referring now again to FIG. 4, block 176 outputs the brake command for each wheel as determined by block 404 (FIG. 12). The brake commands are output in any manner known to those skilled in the art. For brake systems with reciprocating piston-type actuators, the brake commands are output to control the reciprocating piston actuators to achieve a brake pressure corresponding to the commanded brake torque using closed loop pressure control in a manner known to those skilled in the art.

Alternatively, the brake command is converted to a position command for the reciprocating piston actuator to eliminate the closed loop pressure control, in which case, the reciprocating piston actuator is operated in either an open loop or closed loop position control mode.

In yet another alternative example, the brake command is converted to a brake pressure command and used in a closed loop pressure control of a solenoid valve type brake control system. In another example, the brake command is used as either a current or position command for an electric motor-driven brake actuator.

In short, any controllable brake system available to those skilled in the art capable of making use of the yaw control brake commands as determined according to this invention can be used with this invention.

We claim:

1. A brake control system method for use in a vehicle according to the steps of:

determining, responsive to a sensor, a vehicle yaw rate;

determining, responsive to a vehicle speed signal and a steering wheel position, a desired yaw rate;

determining a yaw rate error equal to a difference between the vehicle yaw rate and the desired yaw rate;

determining a yaw force command responsive to the yaw rate error;

responsive to the yaw force command, determining a first brake command adjustment for a first wheel of the vehicle, wherein the first brake command adjustment represents a first minimum of (i) a total yaw force commanded by the yaw force command and (ii) a first available yaw force representative of a first yaw force output that the first wheel can impart on the vehicle;

first determining whether the first brake command adjustment represents the total yaw force commanded by the yaw force command; and responsive to the first determination, determining a second brake command adjustment for a second wheel of the vehicle only if the first brake command adjustment does not achieve on a body of the vehicle the total yaw force commanded by the yaw force command.

2. A brake control system method according to claim 1, wherein the second brake command adjustment represents a second minimum of (i) a difference between the total yaw force commanded by the yaw force command and the first available yaw force and (ii) a second available yaw force representative of a second yaw force output that the second wheel can impart on the vehicle, also comprising the steps of:

second determining whether the first and second brake command adjustments together represent the total yaw force commanded; and responsive to the second determination, determining a third brake command adjustment for a third wheel of the vehicle only if the first and second brake command adjustments together do not achieve on the body of the vehicle the total commanded yaw force.

3. A brake control system method for use in a vehicle with a body according to the steps of:

determining a yaw force command responsive to a plurality of vehicle sensor inputs;

determining a first brake adjustment for only a first wheel brake if the first brake adjustment for the first wheel brake can transfer a total yaw force commanded by the yaw force command to the vehicle body; and determining the first brake adjustment for the first wheel brake and a second brake adjustment for a second wheel brake only if the first wheel brake alone cannot transfer the total yaw force commanded to the vehicle body.

4. A brake control method according to claim 3, also comprising the steps of:

determining the first and second brake adjustments for the first and second wheel brakes and a third brake adjustment for a third wheel brake only if the first and second wheel brakes alone cannot transfer the total yaw force commanded to the vehicle body.

5. A brake control system method for use in a vehicle with a body, comprising the steps of:

determining a yaw force command responsive to a plurality of vehicle sensor inputs, wherein the yaw force command commands a total yaw force to the vehicle body; and applying the yaw force command to (a) only one wheel brake of the vehicle if the one wheel brake can transfer the total yaw force to the vehicle body, and (b) two wheel brakes of the vehicle only if the one wheel brake cannot transfer the total yaw force to the vehicle body.

6. A brake control system method according to claim 5, also comprising the step of: applying the yaw force command to (c) three wheel brakes of the vehicle only if the two wheel brakes cannot transfer the total yaw force to the vehicle body.

7. In a vehicle with a controller that determines an operator brake command for each vehicle wheel and an ABS brake command for each vehicle wheel in ABS mode, a brake control system method according to the steps of:

determining a brake adjustment command for at least one wheel responsive to measured vehicle yaw rate; and applying a brake command to the one wheel equal to a minimum of (a) the ABS brake command and (b) a sum of the operator brake command and the brake adjustment command.

8. In a vehicle with a body and a plurality of wheel brakes, a brake control system method for distributing a commanded yaw force to the wheel brakes according to the step of:

distributing the commanded yaw force to the vehicle wheel brakes according to a priority wherein each successive vehicle wheel brake in the priority is commanded only if a sum of all previous vehicle wheel brakes in the priority cannot transfer all of the commanded yaw force to the vehicle body.

9. A brake control system method according to claim 8, wherein a first wheel brake in the priority is selected so that it always requires a positive brake torque adjustment increasing braking to the first wheel brake.

10. In a vehicle with a plurality of wheel brakes, a brake control system method for distributing a commanded yaw force to the wheel brakes according to the steps of:

establishing a hierarchy for distribution of the commanded yaw force to the wheel brakes; and distributing the commanded yaw force to the vehicle wheel brakes according to the hierarchy wherein each successive vehicle wheel brake in the hierarchy is commanded only if a sum of all previous vehicle wheel brakes in the hierarchy cannot transfer all of the commanded yaw force to the vehicle body.

11. A brake control system method according to claim 10, wherein a first front wheel brake and a rear wheel brake on one side of the vehicle share a highest priority in the hierarchy and wherein a second front wheel brake on another side of the vehicle opposite the one side has a second highest priority in the hierarchy.

12. A brake control system method according to claim 10, wherein the hierarchy includes at least one wheel brake requiring positive brake torque adjustment responsive to the yaw force command, wherein said at least one wheel brake requiring positive brake torque adjustment is always highest in the hierarchy.

13. A brake control system method according to claim 12, wherein the hierarchy includes at least on wheel brake requiring negative torque adjustment responsive to the yaw force command.

14. In a vehicle with a body, a right front wheel brake, a right rear wheel brake, a left front wheel brake and a left rear wheel brake, a brake control system method for distributing a commanded yaw force to the wheel brakes according to the step of:

distributing the commanded yaw force to the vehicle wheel brakes according to a priority wherein each successive vehicle wheel brake in the priority is commanded only if a sum of all previous vehicle wheel brakes in the priority cannot transfer all of the commanded yaw force to the vehicle body;

wherein if the vehicle is turning left or if a measured vehicle yaw rate is less than zero, the priority is successively: the left rear wheel brake, the left front wheel brake and the right front wheel brake, and wherein if the vehicle is turning right or if a measured vehicle yaw rate is not less than zero, the priority is successively: the right rear wheel brake, the right front wheel brake and the left front wheel brake.

15. A brake control system method comprising the steps of:

determining a vehicle yaw rate responsive to a yaw sensor;

determining a desired yaw rate responsive to a vehicle speed measurement and a steering wheel angle measurement;

adjusting brake torque to a set of wheel brakes to minimize a difference between the vehicle yaw rate and the desired yaw rate, wherein the wheel brakes are controlled by a hierarchy appointing successive priority to the wheel brakes in the set, wherein each successive brake in the hierarchy has a brake torque adjustment only if a sum of all previous wheel brakes in the hierarchy fails to minimize the difference between the vehicle yaw rate and the desire vehicle yaw rate.

16. A brake control system method for use in a vehicle with a body, according to the steps of:

determining a vehicle yaw rate responsive to a yaw sensor;

determining a desired yaw rate responsive to a vehicle speed measurement and a steering wheel angle measurement;

determining a yaw rate error equal to a difference between the desired yaw rate and the vehicle yaw rate;

operating the brake control in an understeer mode if an absolute value of the vehicle yaw rate is not greater than an absolute value of the desired yaw rate or if an absolute value of the yaw rate error is equal to an absolute value of a difference between the absolute value of the desired yaw rate and the absolute value of the vehicle yaw rate and otherwise operating the brake control in an oversteer mode; and in understeer mode, controlling the brakes to apply a positive yaw force command to the vehicle body; and in oversteer mode, controlling the brakes to apply a negative yaw force command to the vehicle body.

17. A brake control system method according to the steps of:

determining a yaw rate error between a vehicle yaw rate and a desired yaw rate for the vehicle;

determining a yaw force command responsive to the yaw rate error wherein the yaw force command has a proportional term that is linear if the yaw rate error above a predetermined threshold and is nonlinear if the yaw rate error is below the predetermined threshold.

18. A brake control system method according to claim 17, wherein the proportional term has a first nonlinear function if the yaw rate error is below the predetermined threshold and the vehicle is in an understeer mode and a second nonlinear function if the yaw rate error is below the predetermined threshold and the vehicle is in an oversteer mode.

19. In a vehicle with a plurality of wheel brakes, a brake control system method for distributing a commanded yaw force to the wheel brakes according to the steps of:

distributing the commanded yaw force to the vehicle wheel brakes, wherein at least one of the vehicle wheel brakes requires a negative torque adjustment to reduce braking to the at least one vehicle wheel brake responsive to the commanded yaw force; and limiting the negative torque adjustment to an amount less than an operator commanded brake torque for the at least one wheel brake.

* * * * *